United States Patent
Okiga

(10) Patent No.: US 9,793,531 B2
(45) Date of Patent: Oct. 17, 2017

(54) ASSEMBLED BATTERY

(71) Applicant: TOYOTA JIDOSHA KABUSHIKI KAISHA, Toyota-shi, Aichi-ken (JP)

(72) Inventor: Hiroshi Okiga, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/964,100

(22) Filed: Dec. 9, 2015

(65) Prior Publication Data

US 2016/0172647 A1 Jun. 16, 2016

(30) Foreign Application Priority Data

Dec. 11, 2014 (JP) ................................ 2014-251174

(51) Int. Cl.
*H01M 2/20* (2006.01)

(52) U.S. Cl.
CPC ........... *H01M 2/206* (2013.01); *H01M 2/204* (2013.01)

(58) Field of Classification Search
CPC ............................... H01M 2/202; H01M 2/206
See application file for complete search history.

(56) References Cited

U.S. PATENT DOCUMENTS

| 2010/0009252 A1* | 1/2010 | Matthias | H01M 2/105 429/160 |
| 2013/0130065 A1* | 5/2013 | Park | H01M 2/0275 429/7 |
| 2013/0171843 A1* | 7/2013 | Barnette | H01R 12/7088 439/70 |
| 2014/0370343 A1 | 12/2014 | Nomoto et al. | |

FOREIGN PATENT DOCUMENTS

| JP | 03-218034 A | 9/1991 |
| JP | 2003-045409 A | 2/2003 |
| JP | 2013-045508 A | 3/2013 |
| JP | 2013-109927 A | 6/2013 |
| JP | 2014-022287 A | 2/2014 |
| JP | 2014-086246 A | 5/2014 |

\* cited by examiner

*Primary Examiner* — Olatunji Godo
(74) *Attorney, Agent, or Firm* — Sughrue Mion, PLLC

(57) ABSTRACT

An assembled battery includes a plurality of battery cells, a bus bar that electrically connects the battery cells with each other, and a circuit board that is electrically connected with the battery cells. The bus bar has a first connection part that is electrically connected with the battery cells, and a second connection part that is electrically connected with a connection part of the circuit board via a conductive adhesive. The second connection part has a concave portion that contains the conductive adhesive.

7 Claims, 6 Drawing Sheets

ASSEMBLED BATTERY

INCORPORATION BY REFERENCE

The disclosure of Japanese Patent Application No. 2014-251174 filed on Dec. 11, 2014 including the specification, drawings and abstract is incorporated herein by reference in its entirety.

BACKGROUND OF THE INVENTION

1. Field of the Invention

The invention relates to an assembled battery, and particularly, relates to an assembled battery including a plurality of battery cells, a bus bar that electrically connects the battery cells with each other, and a circuit board that is electrically connected with the plurality of battery cells.

2. Description of Related Art

In an assembled battery in which a plurality of battery cells are connected, a circuit board for detecting the respective voltages of the battery cells and equalizing the respective voltages of the battery cells is electrically connected with the battery cells. For example, in an assembled battery in Japanese Patent Application Publication No. 2003-45409 (JP 2003-45409 A), the circuit board is joined, by nuts, to electrode terminals of the plurality of battery cells, while the electrode terminals are respectively passed through holes formed on the circuit board.

By the manufacturing tolerance of the battery cells, a thickness error sometimes appears between the battery cells. In the assembled battery in JP 2003-45409 A, in which the nut joining is performed while the electrode terminals of the battery cells are passed through the holes of the circuit board, when the thickness error appears between the battery cells, the electrode terminals of the battery cells cannot be passed through the holes of the circuit board. That is, in the assembled battery in JP 2003-45409 A, it is impossible to absorb the thickness error between the battery cells, and to electrically connect the circuit board with the battery cells.

SUMMARY OF THE INVENTION

The invention provides an assembled battery that makes it possible to absorb the thickness error between the battery cells, and to electrically connect the circuit board with the battery cells suitably.

An assembled battery according to an aspect of the invention is an assembled battery including: a plurality of battery cells; a bus bar that electrically connects the battery cells with each other; and a circuit board that is electrically connected with the battery cells, in which the bus bar has a first connection part and a second connection part, the first connection part being electrically connected with the battery cells, the second connection part being electrically connected with a connection part of the circuit board via a conductive adhesive, and the second connection part has a concave portion that contains the conductive adhesive. Thereby, it is possible to absorb the thickness error between the battery cells, and to electrically connect the circuit board with the battery cells suitably.

In the above assembled battery, it is preferable that the concave portion have an opening part at a bottom part. Thereby, it is possible to prevent a poor connection due to the non-filling of the conductive adhesive and an insufficient strength at a connection part between the bus bar and the circuit board.

In the above assembled battery, it is preferable that the second connection part be connected with the first connection part via a step part, such that the gap between the second connection part and the battery cells is wider than the gap between the first connection part and the battery cells. Thereby, it is possible to secure a large workspace for connecting the circuit board with the bus bar.

According to the above aspect, it is possible to provide an assembled battery that makes it possible to absorb the thickness error between the battery cells and to electrically connect the circuit board with the battery cells suitably.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, specific embodiments in which the invention is applied will be described in detail, with reference to the drawings. Here, the invention is not limited to the following embodiments. Further, for a clear explanation, the following description and the drawings are appropriately simplified.

Embodiment 1

Figure 1:
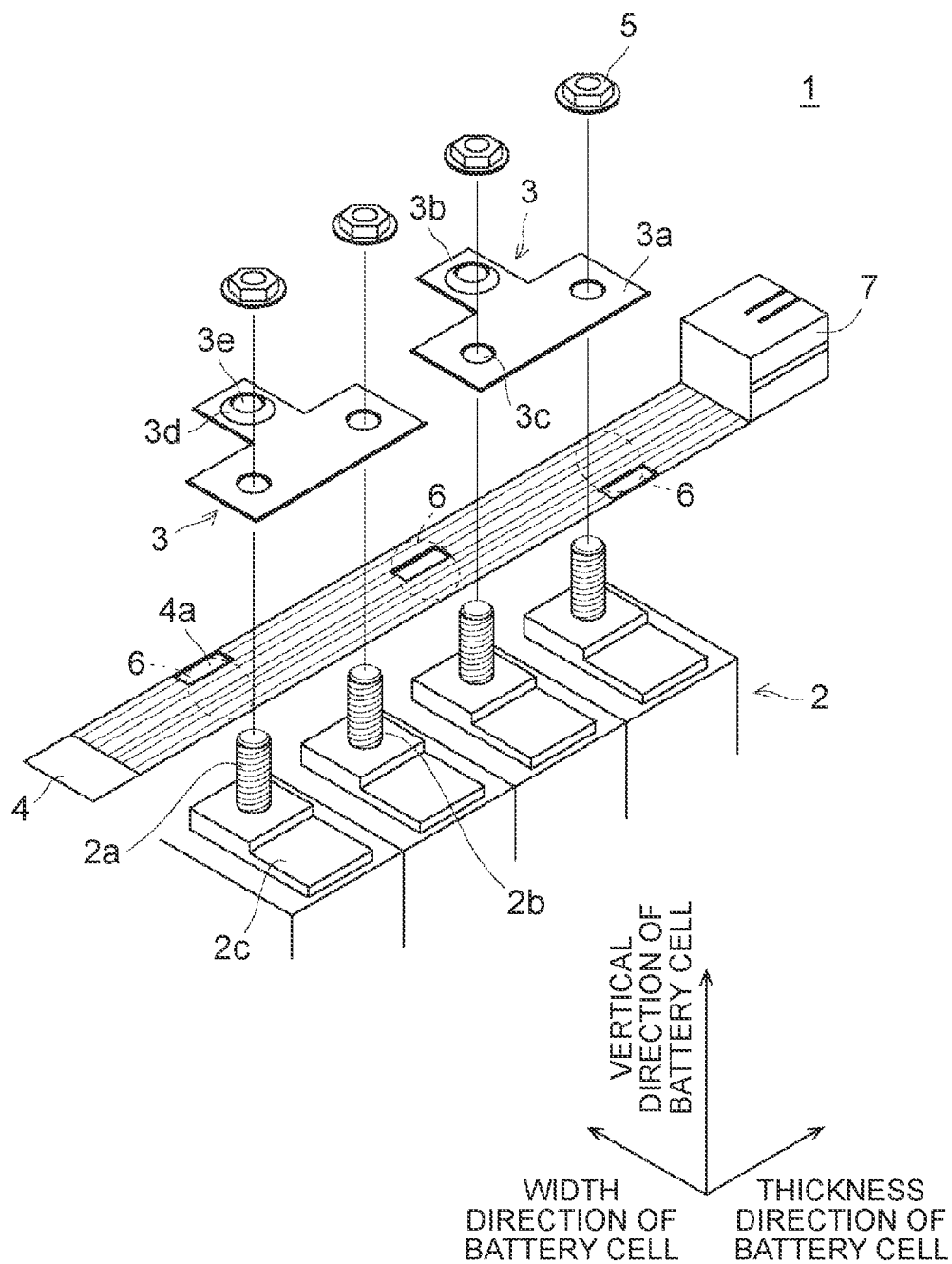
FIG. 1 is an enlarged exploded view showing an upper part of an assembled battery in Embodiment 1.
Figure 2:
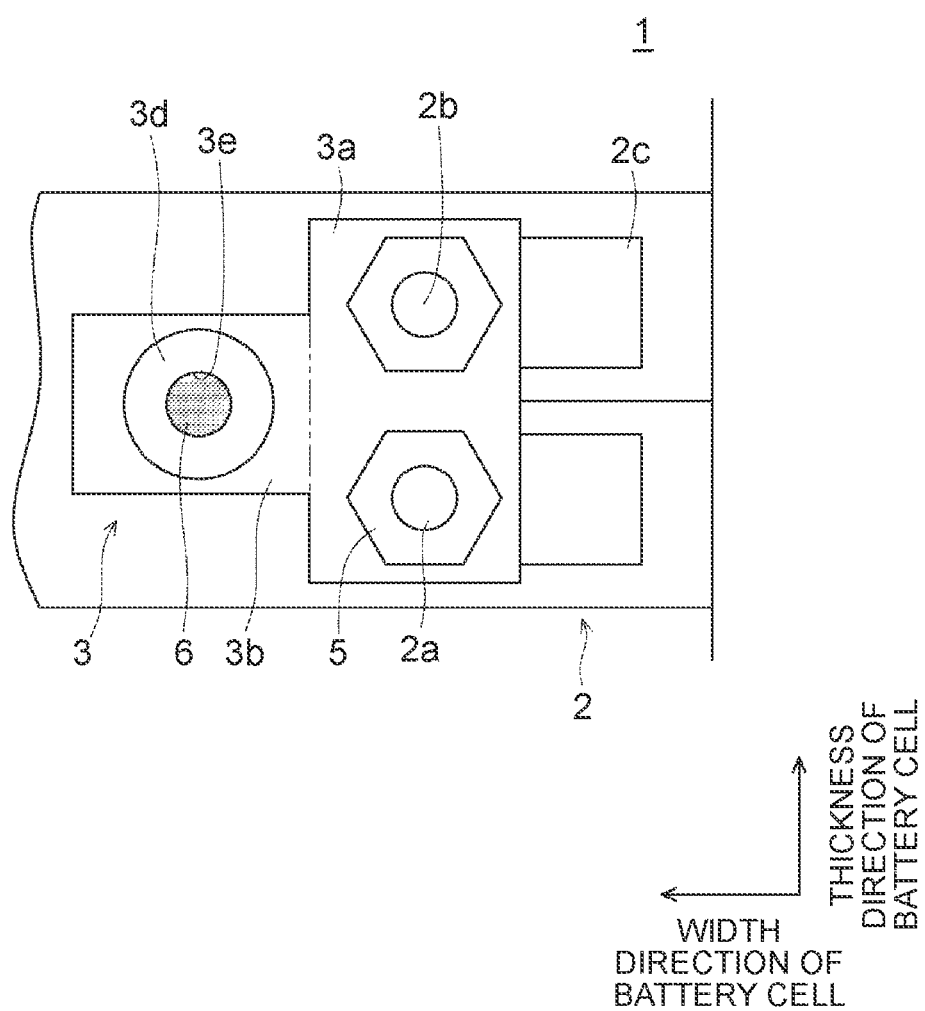
FIG. 2 is an enlarged plan view showing the assembled battery in Embodiment 1.
Figure 3A:
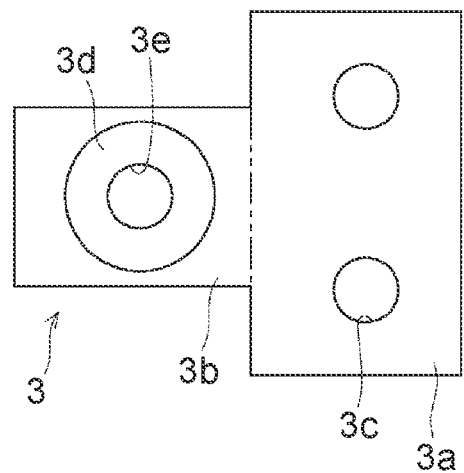
FIG. 3A is a plan view showing a bus bar in Embodiment 1.
Figure 3B:
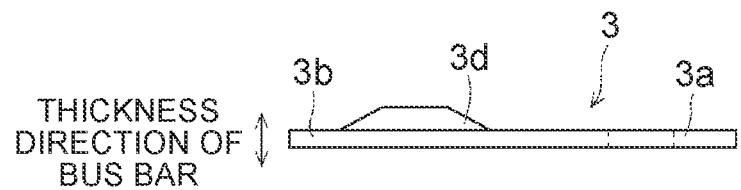
FIG. 3B is a lateral view of the bus bar in Embodiment 1.

The configuration of an assembled battery in the embodiment will be described. FIG. 1 is an enlarged exploded view showing an upper part of the assembled battery in the embodiment. FIG. 2 is an enlarged plan view showing the assembled battery in the embodiment. FIG. 3A is a plan view showing a bus bar in the embodiment. FIG. 3B is a lateral view of the bus bar in the embodiment.

As shown in FIG. 1 and FIG. 2, the assembled battery 1 includes battery cells 2, bus bars 3, and a circuit board 4. The battery cell 2 is a general lithium-ion battery or the like. On the upper surface, an electrode terminal 2a, which is one of a positive electrode and a negative electrode, is provided at one end in the width direction of the battery cell 2, and an electrode terminal 2b, which is the other of the positive electrode and the negative electrode, is provided at the other end.

As shown in FIG. 1, the electrode terminals 2a, 2b in the embodiment, which are rod screws, protrude upward from bases 2c provided on the upper surfaces of the battery cells 2, respectively. The plurality of battery cells 2 are arrayed in the thickness direction of the battery cells 2.

The bus bar 3, which is a plate-shaped member composed of a conductive material, electrically connects the electrode terminal 2a of one of adjacent battery cells 2 and the electrode terminal 2b of the other of the battery cells 2. As shown in FIG. 1 and FIG. 3A, the bus bar 3 in the embodiment is a flat plate member having a nearly T-shape as viewed from the thickness direction of the bus bar 3, and has a first connection part 3a that is electrically connected with the electrode terminals 2a, 2b, and a second connection part 3b that is electrically connected with the circuit board 4. Here, the shape of the bus bar 3 is not particularly limited, and for example, may be a nearly L-shape or the like. Further, although the bus bar 3 in the embodiment electrically connects the adjacent battery cells 2 with each other, the battery cells 2 to be connected do not need to be adjacent. Here, in FIG. 3A and others, the border between the first connection part 3a and the second connection part 3b is shown by an alternate long and short dash line.

On the first connection part 3a, holes 3c are formed at an interval. As shown in FIG. 1 and FIG. 2, the electrode terminal 2a of one of the adjacent battery cells 2 and the electrode terminal 2b of the other of the battery cells 2 are passed through the holes 3c, respectively, and the first connection part 3a is electrically connected with the electrode terminals 2a, 2b, by nuts 5.

On the second connection part 3b, a concave portion 3d that is dented in the thickness direction of the bus bar 3 is formed. As shown in FIG. 1, FIG. 3A and FIG. 3B, the concave portion 3d in the embodiment is formed in a truncated cone shape, and is dented such that the diameter is reduced upward. The concave portion 3d contains a conductive adhesive 6 for electrically connecting the circuit board 4. Here, as the conductive adhesive 6, a general conductive adhesive can be used.

The circuit board 4, for detecting the respective voltages of the battery cells 2 and equalizing the voltages of the battery cells 2, is electrically connected with the second connection part 3b of the bus bars 3 via the conductive adhesives 6. The circuit board 4 in the embodiment is a printed circuit board, and can input and output signals for an external control device (the illustration is omitted), through a connector 7. Then, the circuit board 4 includes a land 4a as a connection part that is connected with the bus bar 3 via the conductive adhesive 6.

Figure 4:
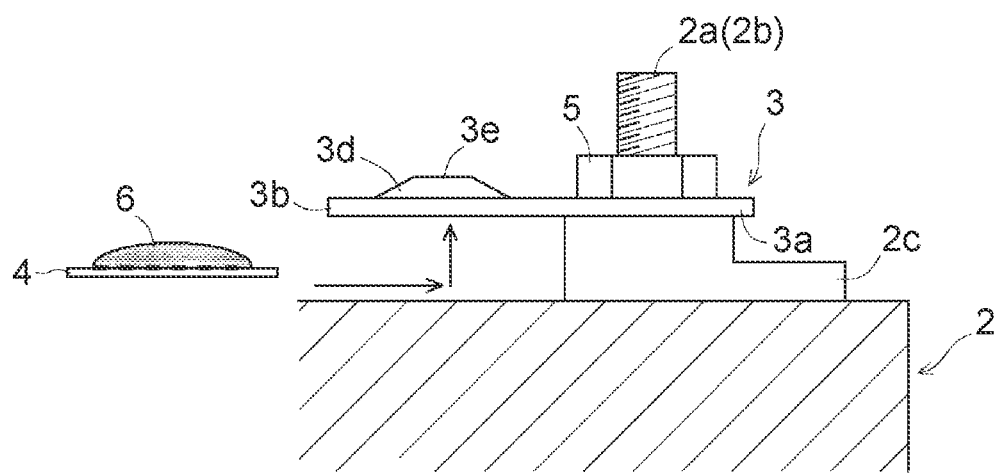
FIG. 4 is a diagram showing a state before a circuit board is electrically connected with the bus bar in Embodiment 1.
Figure 5:
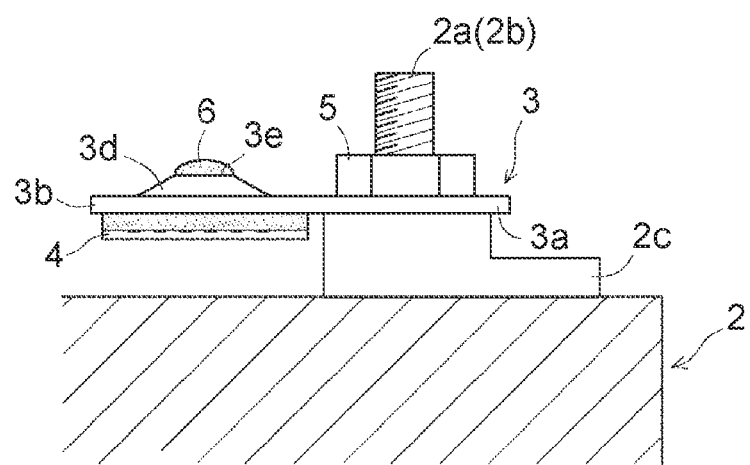
FIG. 5 is a diagram showing a state in which the circuit board is electrically connected with the bus bar in Embodiment 1.

Next, an assembly process of the assembled battery 1 in the embodiment will be described. FIG. 4 is a diagram showing a state before the circuit board is electrically connected with the bus bar in the embodiment. FIG. 5 is a diagram showing a state in which the circuit board is electrically connected with the bus bar in the embodiment.

First, the plurality of battery cells 2 are arrayed, and the electrode terminal 2a of one of the adjacent battery cells 2 and the electrode terminal 2b of the other of the battery cells 2 are passed through the holes 3c of the bus bar 3. The nuts 5 are screwed around the electrode terminals 2a, 2b so that the first connection part 3a of the bus bar 3 is sandwiched between the nuts 5 and the bases 2c. As a result, the bus bar 3 is electrically connected with the electrode terminals 2a, 2b.

Next, as shown in FIG. 1 and FIG. 4, the conductive adhesive 6 is applied on the land 4a of the circuit board 4, and the circuit board 4 is pressed onto the second connection part 3b of the bus bar 3 from the lower side of the bus bar 3, such that the conductive adhesive 6 is contained in the concave portion 3d of the bus bar 3. Incidentally, in FIG. 1, the regions surrounded by the dashed lines are the application regions of the conductive adhesives 6.

At this time, the conductive adhesive 6 is contained in the concave portion 3d, allowing for the prevention of the protrusion of the conductive adhesive 6. Thereby, it is possible to prevent an insulation failure and pressure-resistance reduction due to the adhesion of the conductive adhesive 6 to another member.

Here, it is preferable that an opening part 3e be formed at the bottom part (that is, the upper end part) of the concave portion 3d of the bus bar 3. Thereby, it is possible to release the residual air and evaporated conductive adhesive 6 in the concave portion 3d. Furthermore, the circuit board 4 is pressed onto the second connection part 3b of the bus bar 3 until the conductive adhesive 6 overflows from the opening part 3e of the concave portion 3d, and thereby, it is possible to visually confirm that the conductive adhesive 6 has been filled into the concave portion 3d. Therefore, it is possible to prevent a poor connection due to the non-filling of the conductive adhesive 6 and an insufficient strength at the connection part between the bus bar 3 and the circuit board 4.

Next, the conductive adhesive 6 cures, and thereby, the assembly of the assembled battery 1 is completed. Here, in the case where the opening part 3e is formed on the concave portion 3d, it is possible to make the conductive adhesive 6 cure, by using a photo-curable conductive adhesive as the conductive adhesive 6 and irradiating the opening part 3e with light. Thereby, it is possible to shorten the manufacturing time of the assembled battery 1.

Thus, in the assembled battery 1 according to the embodiment, with use of the conductive adhesive 6, the circuit board 4 is electrically connected with the bus bars 3 and further the battery cells 2, and therefore, by the conductive adhesive 6, it is possible to absorb the thickness error between the battery cells 2. Accordingly, it is possible to absorb the thickness error between the battery cells 2, and to electrically connect the circuit board 4 with the battery cells 2 suitably.

In the case where the nut joining is performed while the electrode terminals of the battery cells are passed through the holes of the circuit board in the conventional way, the electrode terminals of the battery cells cannot be passed through the holes of the circuit board due to the thickness error between the battery cells 2, and defective circuit boards are produced. Further, when the electrode terminals of the battery cells are passed through the holes of the circuit board, the circuit board is distorted, resulting in the separation or disconnection of wires, the decrease in the reliability for solder joint parts of components mounted on the circuit board, or the like. On the other hand, in the assembled battery 1 according to the embodiment, the thickness error between the battery cells 2 is absorbed by the conductive adhesive 6, and therefore, the circuit board is not distorted, allowing for the increase in the reliability of the assembled battery 1 compared to the related assembled battery.

Further, in the case where the circuit board is joined by nuts in the conventional way, a trouble such as the loosening of the nuts due to the creep of the circuit board is likely to occur. However, in the assembled battery 1 according to the embodiment, with use of the conductive adhesive 6, the circuit board 4 is joined to the bus bar 3, and therefore, a trouble such as the loosening of the nuts does not occur.

Embodiment 2

Figure 6:
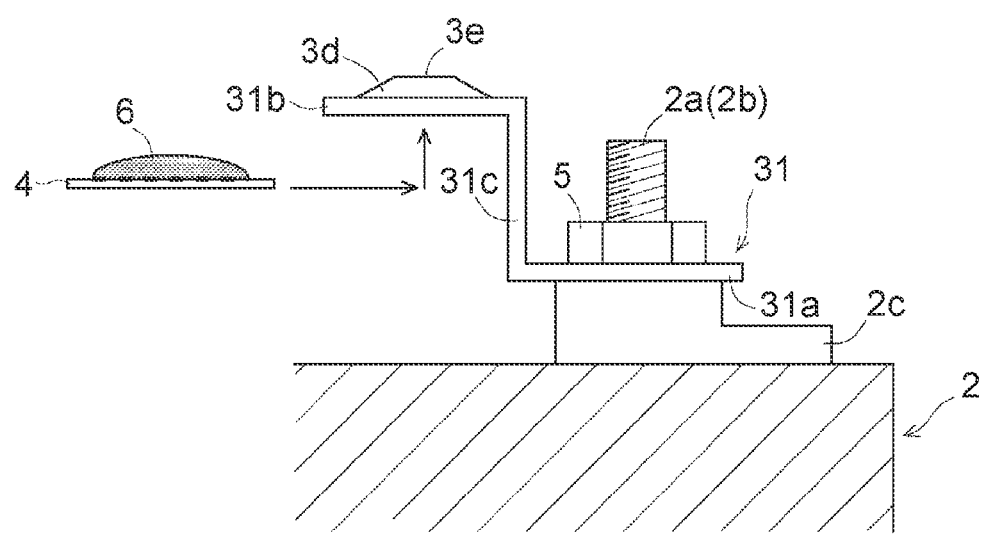
FIG. 6 is a diagram showing a state before the circuit board is electrically connected with a bus bar in Embodiment 2.

The bus bar 3 in the Embodiment 1 is formed as a flat plate member, but is not limited to this. That is, in a bus bar 31 shown in FIG. 6, a second connection part 31*b* is connected with a first connection part 31*a* via a step part 31*c*, such that the interval between the second connection part 31*b* and the upper surface of the battery cell 2 is wider. In other words, the bus bar 31 is bent such that the interval between the second connection part 31*b* and the upper surface of the battery cell 2 is wider than the interval between the first connection part 31*a* and the upper surface of the battery cell 2. Thereby, it is possible to secure a large workspace for connecting the circuit board 4 with the bus bar 31. Here, in FIG. 6, the same elements as the bus bar 3 in Embodiment 1 are denoted using the same reference characters.

Embodiment 3

Figure 7A:
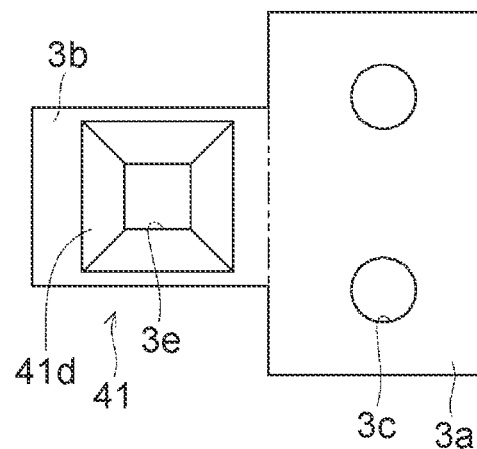
FIG. 7A is a plan view showing a bus bar in Embodiment 3.
Figure 7B:
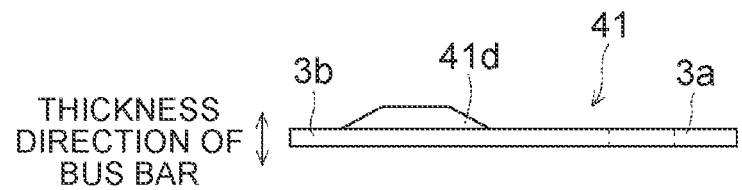
FIG. 7B is a lateral view of the bus bar in Embodiment 3.
Figure 8A:
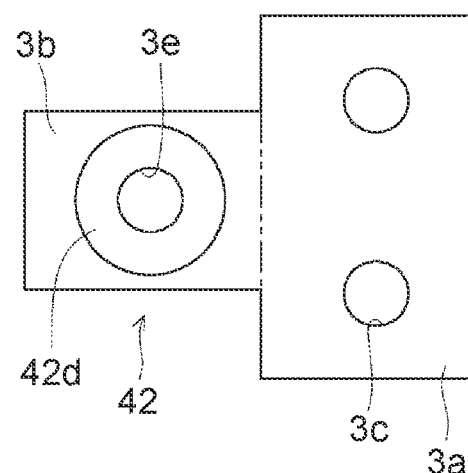
FIG. 8A is a plan view showing a different bus bar in Embodiment 3.
Figure 8B:
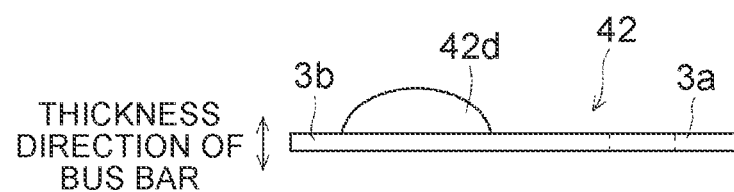
FIG. 8B is a lateral view of the different bus bar in Embodiment 3.

The concave portion 3*d* in Embodiment 1 and Embodiment 2 has a truncated cone shape, but is not limited to this. That is, as shown in FIG. 7A and FIG. 7B, a concave portion 41*d* of a bus bar 41 may be formed in a truncated square pyramid shape. Further, as shown in FIG. 8A and FIG. 8B, a concave portion 42*d* of a bus bar 42 may be formed in a hemisphere shape. In short, the shape is not particularly limited, as long as the conductive adhesive 6 can be contained. Here, in FIG. 7A, FIG. 7B, FIG. 8A and FIG. 8B, the same elements as the bus bar 3 in Embodiment 1 are denoted using the same reference characters.

The invention is not limited to the above embodiments, and can be appropriately modified in a range without departing from the spirit.

What is claimed is:

1. An assembled battery comprising:
   a plurality of battery cells;
   a bus bar that electrically connects the battery cells with each other; and
   a circuit board that is electrically connected with the battery cells,
   wherein the bus bar has a first connection part and a second connection part, the first connection part being electrically connected with the battery cells, the second connection part being electrically connected with a connection part of the circuit board via a conductive adhesive, and
   wherein the second connection part has a concave portion that contains the conductive adhesive, and the concave portion is dented in a thickness direction of the bus bar, wherein the thickness direction is parallel to a vertical direction of the battery cells.

2. The assembled battery according to claim 1, wherein the concave portion has an opening part at a bottom part.

3. The assembled battery according to claim 1, wherein the second connection part is connected with the first connection part via a step part, such that a gap between the second connection part and the battery cells is wider than a gap between the first connection part and the battery cells.

4. The assembled battery according to claim 1, wherein the concave portion is formed in a truncated cone shape.

5. The assembled battery according to claim 1, wherein the concave portion is formed in a truncated square pyramid shape.

6. The assembled battery according to claim 1, wherein the concave portion is formed in a hemisphere shape.

7. The assembled battery according to claim 1, wherein the concave portion is dented such that a diameter of the concave portion is reduced upward in the thickness direction of the bus bar.

* * * * *